US008608221B1

(12) United States Patent
Krajenke et al.

(10) Patent No.: US 8,608,221 B1
(45) Date of Patent: Dec. 17, 2013

(54) RESETTABLE POP-UP SYSTEM FOR A CLOSURE PANEL

(75) Inventors: Gary W. Krajenke, Warren, MI (US); Alvin N. Standard, Clarkston, MI (US); Stephen W. Krajenke, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/560,003

(22) Filed: Jul. 27, 2012

(51) Int. Cl.
*B60J 5/00* (2006.01)

(52) U.S. Cl.
USPC ............ 296/76; 296/106; 296/146.8; 296/56; 292/DIG. 72; 49/386

(58) Field of Classification Search
USPC ........ 296/146.11, 146.12, 146.8, 76, 106, 56, 296/193.11; 180/69.2, 69.21; 292/DIG. 72, 292/DIG. 42, DIG. 65, 336.3, 1; 49/386.387
See application file for complete search history.

(56) References Cited

U.S. PATENT DOCUMENTS

| | | | | |
|---|---|---|---|---|
| 3,743,335 | A * | 7/1973 | Reilhac et al. | 292/127 |
| 3,893,207 | A * | 7/1975 | Rudaitis et al. | 180/69.21 |
| 4,961,601 | A * | 10/1990 | Lindholm et al. | 292/216 |
| 5,048,877 | A * | 9/1991 | Rogers et al. | 292/110 |
| 6,070,921 | A * | 6/2000 | Valasin | 292/216 |
| 6,581,987 | B1 * | 6/2003 | Gentile et al. | 292/216 |
| 8,240,006 | B2 * | 8/2012 | Lee | 16/297 |
| 2005/0156447 | A1 * | 7/2005 | Bishop et al. | 296/76 |

* cited by examiner

*Primary Examiner* — Dennis Pedder
(74) *Attorney, Agent, or Firm* — Quinn Law Group, PLLC

(57) ABSTRACT

A counterbalanced hinge system rotatably attaches a closure panel to a body for rotation about a rotation axis. The counterbalanced hinge system applies an assist torque to the closure panel to bias the closure panel about the rotation axis from a closed position into an open position. A pop-up system is moveable from an un-sprung position into a sprung position to apply an opening force to the closure panel. A reset system includes a connecting cable interconnecting the counterbalanced hinge system and the pop-up system. The reset system converts a portion of the assist torque applied by the counterbalanced hinge system into linear motion of the connecting cable to move the pop-up system from the sprung position into the un-sprung position automatically upon the closure panel moving from the closed position into the open position.

20 Claims, 8 Drawing Sheets

RESETTABLE POP-UP SYSTEM FOR A CLOSURE PANEL

TECHNICAL FIELD

The invention generally relates to a resettable pop-up system for providing an initial opening force to a closure panel, such as but not limited to a trunk lid, to move the closure panel from a fully closed position to a partially open position to allow an operator to grasp the closure panel.

BACKGROUND

Vehicles having a selectively closeable closure panel, such as but not limited to a trunk lid or the like, often include a pop-up system that provides an initial opening force to the closure assembly. Upon a latch mechanism releasing the closure panel and allowing the closure panel to rotate from a fully closed position into a fully open position, the pop-up system applies the opening force to the closure panel to move the closure panel out of the fully closed position and into a slightly opened position, thereby allowing an operator to easily grasp an edge of the closure panel and move the closure panel into the fully open position. The pop-up systems may be loaded for the next opening event during a previous closing event, thereby increasing the force required to move the closure panel into the closed position.

Often, the closure panels are rotatably coupled to the body of the vehicle by a counterbalanced hinge system. The counterbalanced hinge system provides an opening torque to the closure panel to bias the closure panel from the closed position into the open position, thereby reducing the force the operator must apply to lift and move the closure panel. Often, the counterbalanced hinge systems introduce excess energy into the closure panel, causing the closure panel to bobble at the open position.

SUMMARY

A vehicle is provided. The vehicle includes a body, and a counterbalanced hinge system rotatably attaching a closure panel to the body for rotation about a rotation axis. The counterbalanced hinge system applies an assist torque to the closure panel to bias the closure panel about the rotation axis from a closed position into an open position. A latch system selectively couples the closure panel to the body in the closed position, and selectively releases the closure panel to allow the closure panel to move from the closed position into the open position. A pop-up system is moveable from an un-sprung position into a sprung position to apply an opening force to the closure panel. The opening force is applied to the closure panel to move the closure panel out of the closed position simultaneously with the latch system selectively releasing the closure panel. A reset system includes a connecting cable interconnecting the counterbalanced hinge system and the pop-up system. The reset system converts a portion of the assist torque applied by the counterbalanced hinge system into linear motion of the connecting cable to move the pop-up system from the sprung position into the un-sprung position automatically upon the closure panel moving into the open position.

Accordingly, the pop-up system is automatically reset for the next opening event by the closure panel moving from the closed position into the open position, thereby eliminating any excess force required to reset the pop-up system while closing the closure panel. The reset system uses the rotational energy of the closure panel during the opening process to reset the pop-up system, thereby reducing the energy in the closure panel during the opening event, which reduces bobble in the closure panel upon moving into the fully open position.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
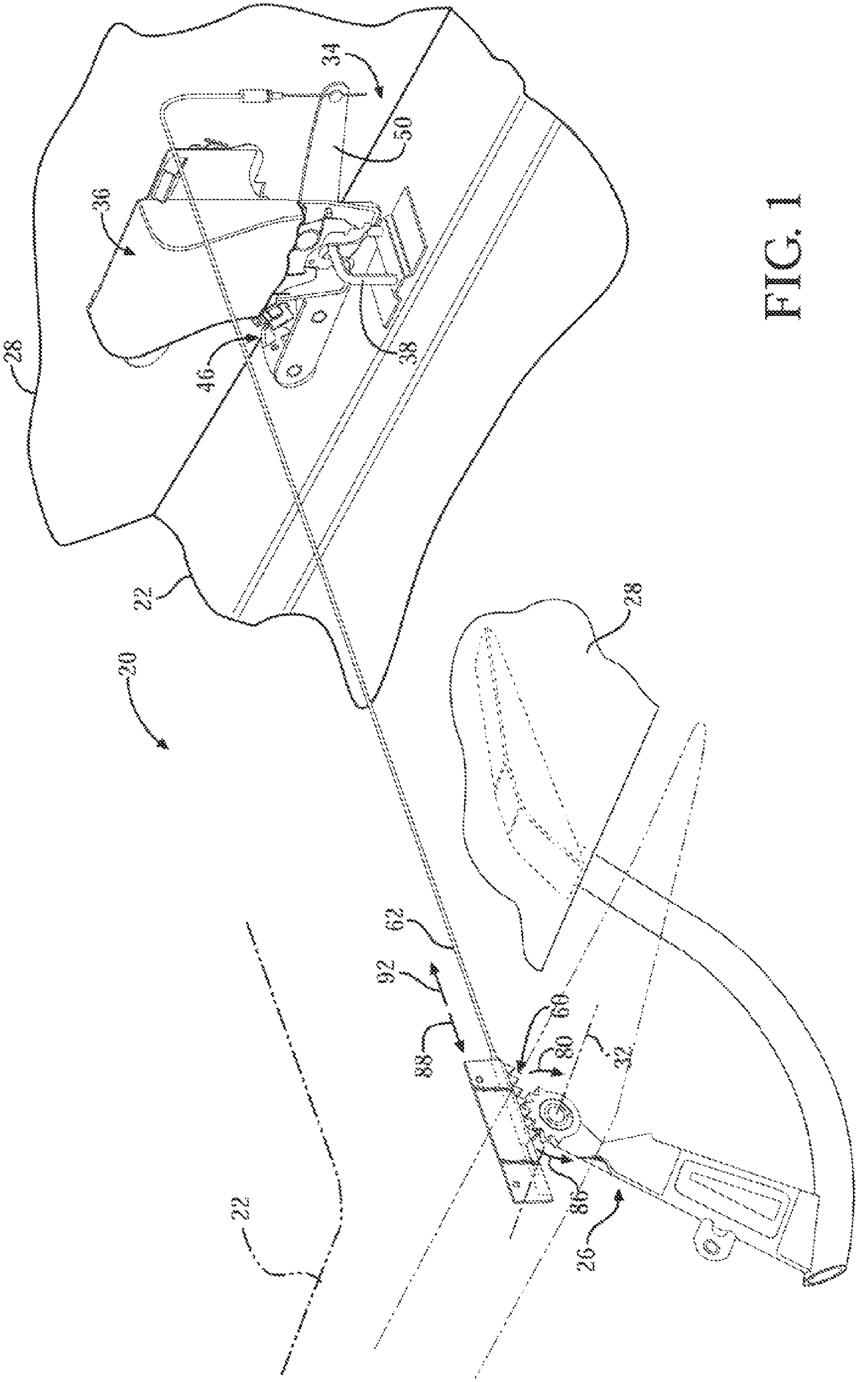
FIG. 1 is a schematic perspective diagram of a vehicle.

Referring to the Figures, wherein like numerals indicate like parts throughout the several views, a vehicle is generally shown at 20. Referring to FIG. 1, the vehicle 20 includes a body 22 defining an opening, such as for example, a trunk or cargo area of the vehicle 20. The vehicle 20 includes a counterbalanced hinge system 26 that rotatably connects a closure panel 28, such as but not limited to a trunk decklid, to the body 22. While only a single counterbalanced hinge is shown in the Figures, it should be appreciated that the vehicle 20 may include a pair of counterbalanced hinges, one each on opposing lateral sides of the vehicle 20, with each of the counterbalanced hinges being mirror images of each other and not directly connected to each other.

Figure 2:
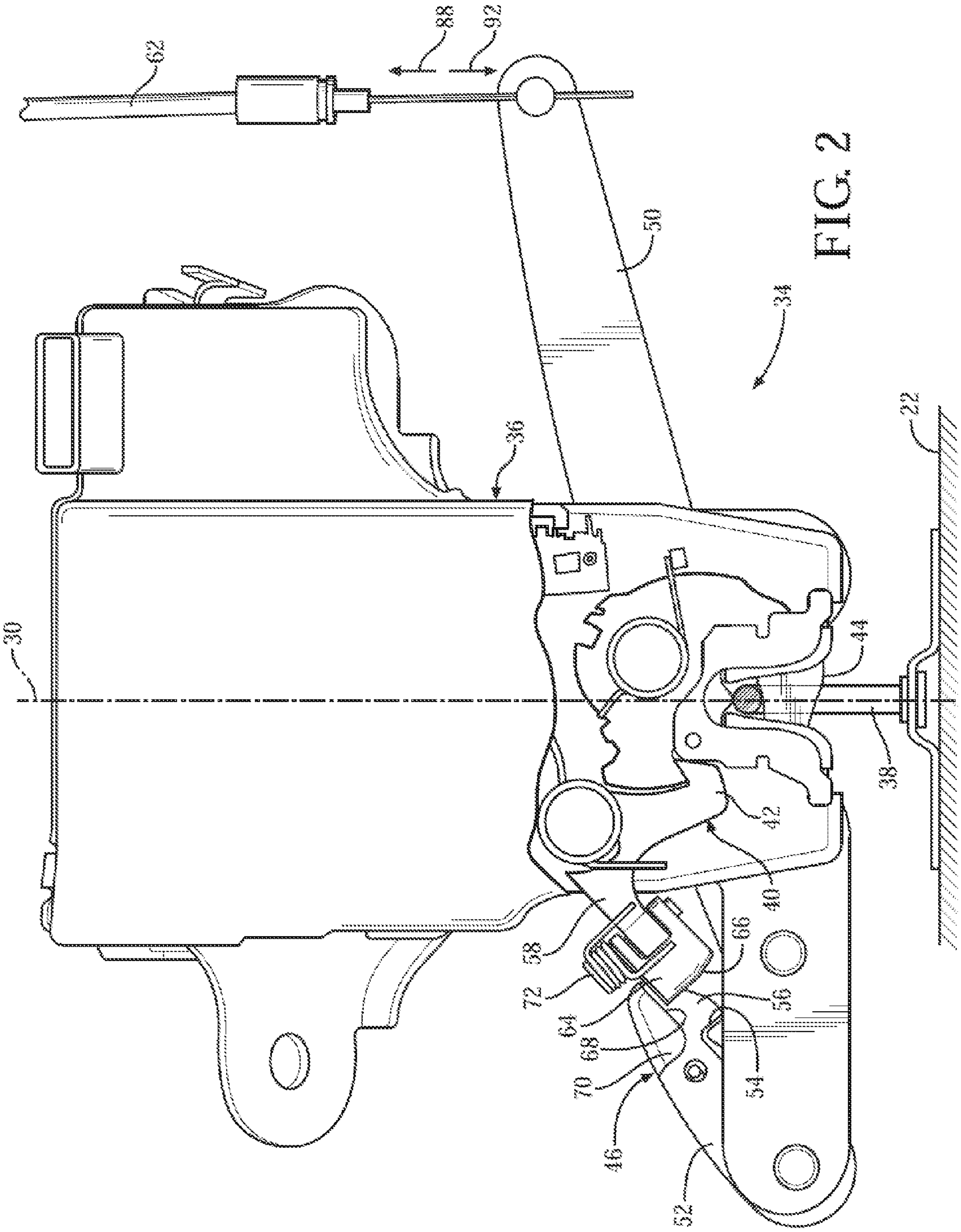
FIG. 2 is a schematic plan view of a latch system having an integrated pop-up system coupled to the reset system.
Figure 3:
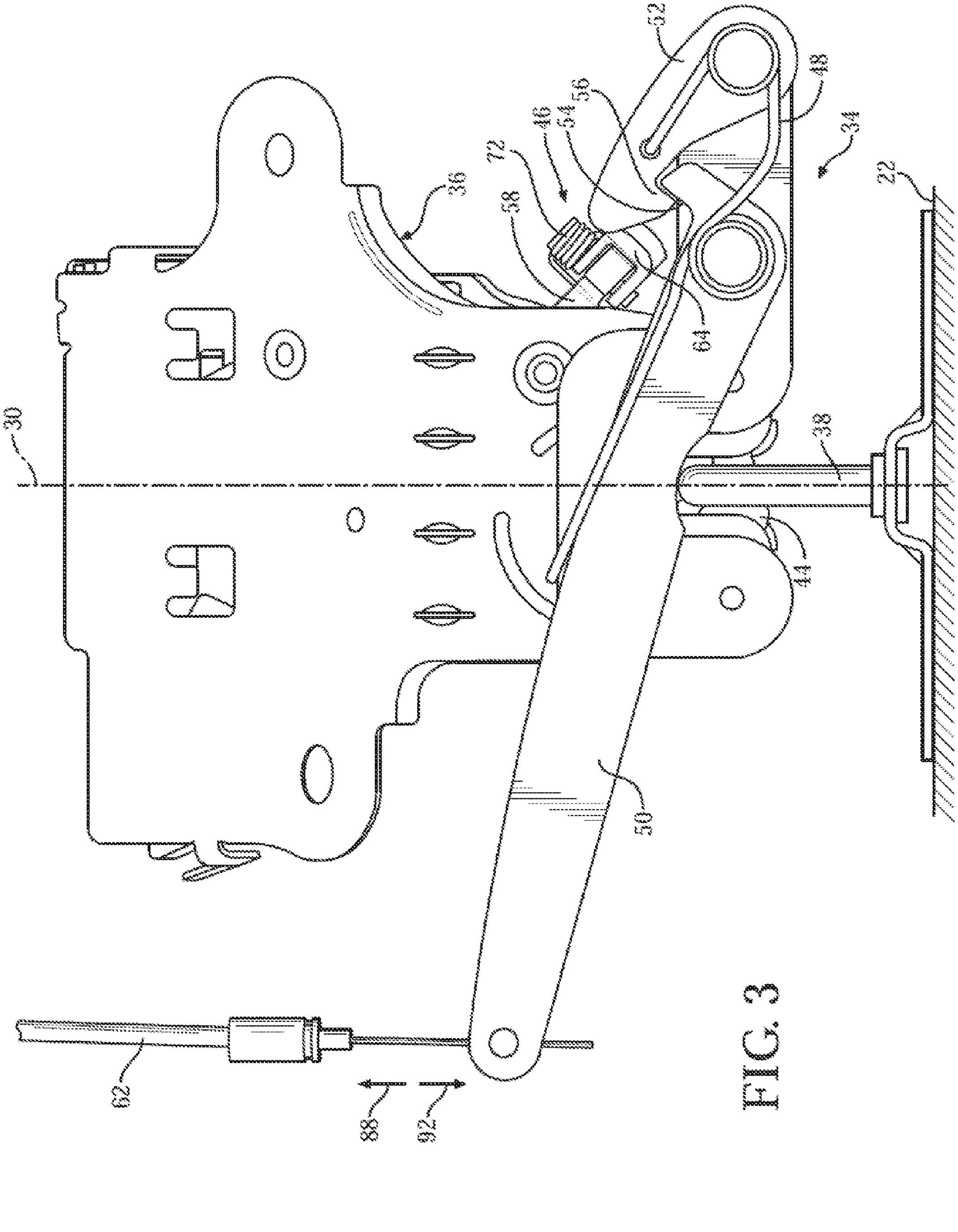
FIG. 3 is a schematic plan view of the latch system and integrated pop-up system, showing the pop-up system in an un-sprung position.
Figure 4:
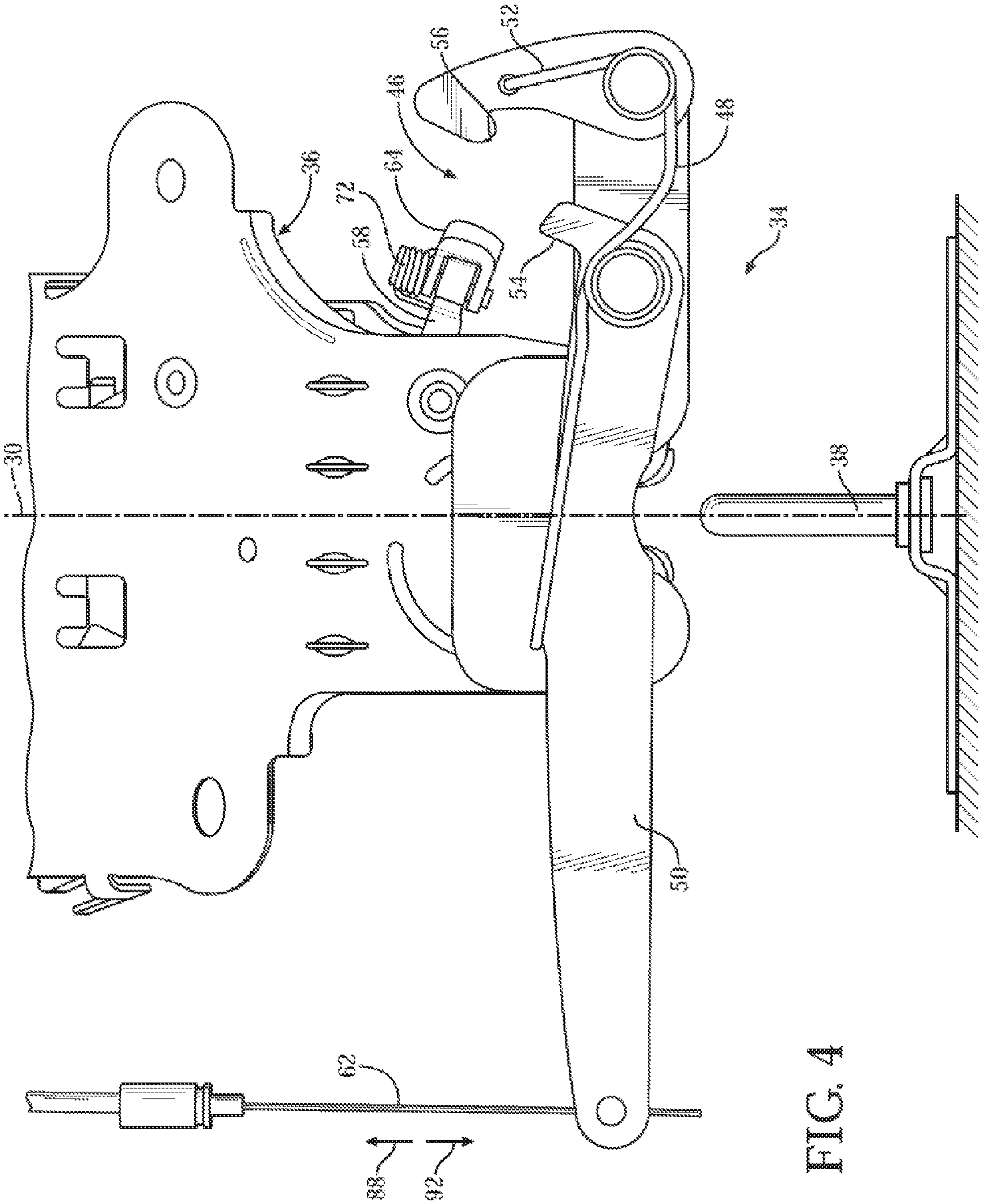
FIG. 4 is a schematic plan view of the latch system and integrated pop-up system, showing the pop-up system in a sprung position.

The body 22 extends along a longitudinal axis 30, shown in FIGS. 2-4, between a forward end and a rearward end. The counterbalanced hinge system 26 rotatably attaches the closure panel 28 to the body 22 for rotation about a rotation axis 32, shown in FIG. 1. The rotation axis 32 is perpendicular relative to the longitudinal axis 30 of the vehicle 20. However, the relative positions between the rotation axis 32 and the longitudinal axis 30 of the vehicle 20 may differ from that shown and described herein. The closure panel 28 is rotatable between a closed position for sealing the opening, and an open position for allowing access to the opening.

As described above, the counterbalanced hinge system 26 rotatably attaches the closure panel 28 to the body 22 for rotation about the rotation axis 32. In addition, the counterbalanced hinge assembly includes a bias member, such as but not limited to a bar spring or a coil spring, that applies an assist torque to the closure panel 28 to bias the closure panel 28 about the rotation axis 32 from the closed position into the open position. In so doing, the counterbalanced hinge system 26 reduces the amount of force that an operator must apply to the closure panel 28 to move the closure panel 28 from the closed position into the open position. The counterbalanced hinge system 26 may include any hinge system capable of rotatably attaching the closure panel 28 to the body 22 and applying the assist torque to the closure panel 28.

A latch system 34 selectively couples the closure panel 28 to the body 22 when the closure panel 28 is disposed in the closed position. The latch system 34 selectively releases the closure panel 28 when actuated to allow the closure panel 28 to move from the closed position into the open position. The latch system 34 includes a latch mechanism 36 attached to one of the body 22 or the closure panel 28, and a striker 38 attached to the other of the body 22 and the closure panel 28. As shown in the Figures, the latch mechanism 36 is attached to and moveable with the closure panel 28 and the striker 38 is attached to the body 22. However, it should be appreciated that the relative positions of the latch mechanism 36 and the striker 38 may be reversed, with the striker 38 attached to and moveable with the closure panel 28, and the latch mechanism 36 attached to the body 22.

The latch mechanism 36 may include any mechanism capable of selectively grasping and releasing the striker 38. For example, referring to FIG. 2, the latch mechanism 36 includes a pawl assembly 40. The pawl assembly 40 is rotatably moveable, and includes a first lever arm 42 extending therefrom. The first lever arm 42 selectively engages a detent on a fork bolt 44 in interlocking engagement to secure the fork bolt 44 in position with the striker 38 secured to the latch mechanism 36. Rotation of the pawl assembly 40 rotates the first lever arm 42 out of interlocking engagement with the detent on the fork bolt 44, thereby allowing the fork bolt 44 to rotate and release the fork bolt 44 from locking engagement with the striker 38.

The vehicle 20 further includes a pop-up system 46. The pop-up system 46 is moveable from an un-sprung position into a sprung position to apply an opening force to the closure panel 28. The opening force moves the closure panel 28 out of the closed position simultaneously with the latch system 34 selectively releasing the closure panel 28.

As shown in FIGS. 2 through 5, the pop-up system 46 is integrated into the latch mechanism 36. Referring to FIGS. 3 and 4, the pop-up system 46 includes a pop-up spring 48. The pop-up spring 48 is disposed in a compressed state when the pop-up system 46 is disposed in the un-sprung position, such as shown in FIG. 3. The pop-up spring 48 is disposed in an un-compressed state when the pop-up system 46 is disposed in the sprung position, such as shown in FIG. 4. Accordingly, when the pop-up system 46 is in the un-sprung position with the pop-up spring 48 in the compressed state, the pop-up spring 48 stores energy. The pop-up spring 48 decompresses, i.e., moves from the compressed state to the uncompressed state, when the latch mechanism 36 releases the closure panel 28, thereby releasing the stored energy of the pop-up spring 48, which is applied to the closure panel 28 to move the closure panel 28.

Referring to FIGS. 2 through 4, the pop-up system 46 includes a pop-up lever 50 and a pop-up detent lever 52 that are each rotatably attached to a base plate of the latch mechanism 36. The pop-up spring 48 is coupled to the base plate, and interconnects the pop-up lever 50 and the pop-up detent lever 52 to bias the pop-up lever 50 and the pop-up detent lever 52 relative to each other. The pop-up lever 50 includes a ledge 54, and the pop-up detent lever 52 includes a tooth 56. The pop-up detent lever 52 is rotatable into a locking position so that the tooth 56 engages the ledge 54 in interlocking engagement to secure the pop-up lever 50 in the un-sprung position and the pop-up spring 48 in the compressed state.

Referring to FIG. 2, the pawl assembly 40 further includes a second lever arm 58. The second lever arm 58 engages the pop-up detent lever 52. Rotation of the pawl assembly 40 to release the interlocking mechanical engagement between the first lever arm 42 and the detent of the fork bolt 44 also rotates the second lever arm 58, which moves the pop-up detent lever 52 into a release position, shown in FIG. 4. When moved into the release position the tooth 56 of the pop-up detent lever 52 is disengaged from the ledge 54 of the pop-up lever 50, thereby allowing the pop-up lever 50 to move into the sprung position. As the detent lever 52 moves from the un-sprung position into the sprung position, the detent lever 52 engages or contacts the striker 38, thereby imparting the opening force to the striker 38 causing the closure panel 28 to move away from the striker 38.

Figure 6:
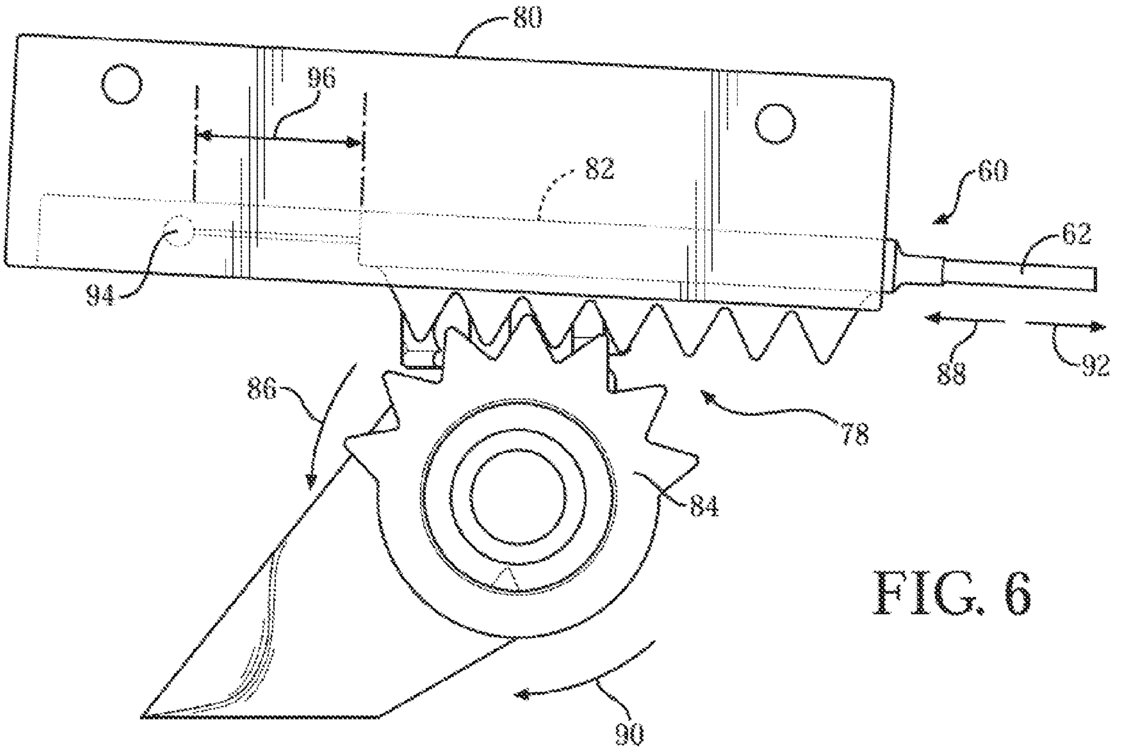
FIG. 6 is an enlarged schematic cross sectional view of the vehicle showing a counterbalanced hinge system coupled to a reset system.

Referring to FIG. 6, the vehicle 20 further includes a reset system 60. The reset system 60 includes a connecting cable 62 interconnecting the counterbalanced hinge system 26 and the pop-up system 46. The reset system 60 converts rotational movement of the counterbalanced hinge system 26 into linear movement of the connecting cable 62 directed along a path. More specifically, the reset system 60 converts a portion of the assist torque applied by the counterbalanced hinge system 26 into the linear movement of the connecting cable 62 to move the pop-up system 46 from the sprung position into the un-sprung position. The reset system 60 moves the pop-up system 46 from the sprung position into the un-sprung automatically upon the closure panel 28 moving into the open position to reset or prepare the pop-up system 46 for the next opening event. The connecting cable 62 is attached to a distal end of the pop-up lever 50. The linear movement of the connecting cable 62 along the path in a first direction 88 moves or rotates the pop-up lever 50 into the un-sprung position with the pop-up spring 48 simultaneously moving the pop-up detent lever 52 into the locking position with the tooth 56 engaging the ledge 54 in interlocking engagement, and compresses the pop-up spring 48 from the un-compressed state into the compressed state.

Figure 5:
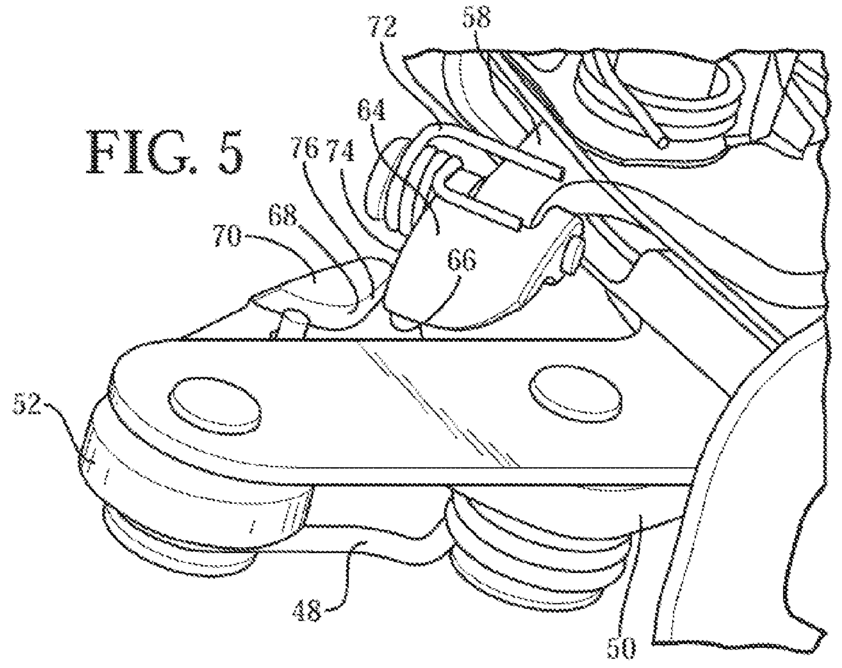
FIG. 5 is an enlarged schematic fragmentary perspective view of the latch system and integrated pop-up system.

Referring to FIG. 5, the second lever arm 58 may include a guide member 64 rotatably attached thereto. The guide member 64 includes a cam surface 66 that engages a ramped surface 68 on the pop-up detent lever 52. Accordingly, when the closure panel 28 moves back into the closed position and the pawl assembly 40 is rotated back into the locking position, the second lever arm 58 rotates and moves over and past the pop-up detent lever 52. The cam surface 66 on the guide member 64 contacts the ramped surface 68 on the pop-up detent lever 52. The interaction between the cam surface 66 and the ramped surface 68 guides the guide member 64 over a raised section 70 of the pop-up detent lever 52, causing the guide member 64 to pivot relative to the second lever arm 58. A guide spring 72 biases the guide member 64 into engagement with the pop-up detent lever 52. Once the pawl assembly 40 is rotated into the locking position with the first lever arm 42 engaging the fork bolt 44, the guide spring 72 biases the guide member 64 against the pop-up detent lever 52 such that an edge 74 of the guide member 64 catches an edge 76 of the raised section 70 of the pop-up detent lever 52. Upon the next opening event, the pawl assembly 40 rotates, causing the guide member 64 to push against the edge 76 of the raised portion and move the pop-up detent lever 52 into the release position. It should be appreciated that the reset system 60 resets the position of the pup-up lever and the pup-up detent lever 52, but that the second lever arm 58 and the guide member 64 are not reset until the closure panel 28 is moved into the closed position.

The reset system 60 may include any system capable of converting the rotational movement of the counterbalanced hinge assembly into linear movement of the connecting cable 62. Referring to FIG. 6, for example, the reset system 60 includes a rack and pinion gear drive 78 that interconnects the body 22 and the counterbalanced hinge system 26. The rack and pinion gear drive 78 includes a rack base 80 that is fixedly attached to the body 22. The rack base 80 slideably supports a rack gear 82 thereon for back and forth movement relative to the rack base 80. A pinion gear 84 is attached to and rotatable with the counterbalanced hinge system 26 about the rotational axis. The rack gear 82 and the pinion gear 84 are disposed in meshing engagement with each other such that rotation of the pinion gear 84 in a first rotational direction 86, as the closure panel 28 moves from the closed position into the open position, moves the rack gear 82 in a first linear direction 88. Similarly, rotation of the pinion gear 84 in a second rotational direction 90, as the closure panel 28 moves from the open position into the closed position, moves the rack gear 82 in a second linear direction 92. The second linear direction 92 is opposite the first linear direction 88.

The connecting cable 62 is coupled to the rack gear 82. More specifically, the connecting cable 62 extends through the rack gear 82 and includes a stop 94 for engaging the rack gear 82. The stop 94 engages the rack gear 82 so that the connecting cable 62 moves with the rack gear 82 in the first linear direction 88. Accordingly, as the closure panel 28 moves from the closed position into the open position causing the pinion gear 84 to rotate in the first rotational direction 86 and the rack gear 82 to move in the first linear direction 88, the rack gear 82 encounters the stop 94 of the connecting cable 62, thereby preventing the rack gear 82 from moving past the stop 94 and causing the connecting cable 62 to move with the rack gear 82. As the connecting cable 62 moves in the first direction with the rack gear 82, the connecting cable 62 pulls on the distal end of the pop-up lever 50, thereby moving the pop-up system 46 back into the un-sprung position as described above.

The rack gear 82 is freely moveable relative to the connecting cable 62 when moving in the second linear direction 92. As such, when the closure panel 28 moves from the open position into the closed position, thereby causing the pinion gear 84 to rotate in the second rotational direction 90 and the rack gear 82 to move in the second linear direction 92, the rack gear 82 moves relative to the connecting cable 62 and away from the stop 94. The rack gear 82 moves a distance 96 from the stop 94 sufficient to allow the pop-up system 46 to actuate. Accordingly, upon the next opening event when the pop-up system 46 is triggered, the connecting cable 62 freely moves in the second linear direction 92 relative to the rack gear 82 without any interference between the stop 94 and the rack gear 82.

Figure 7:
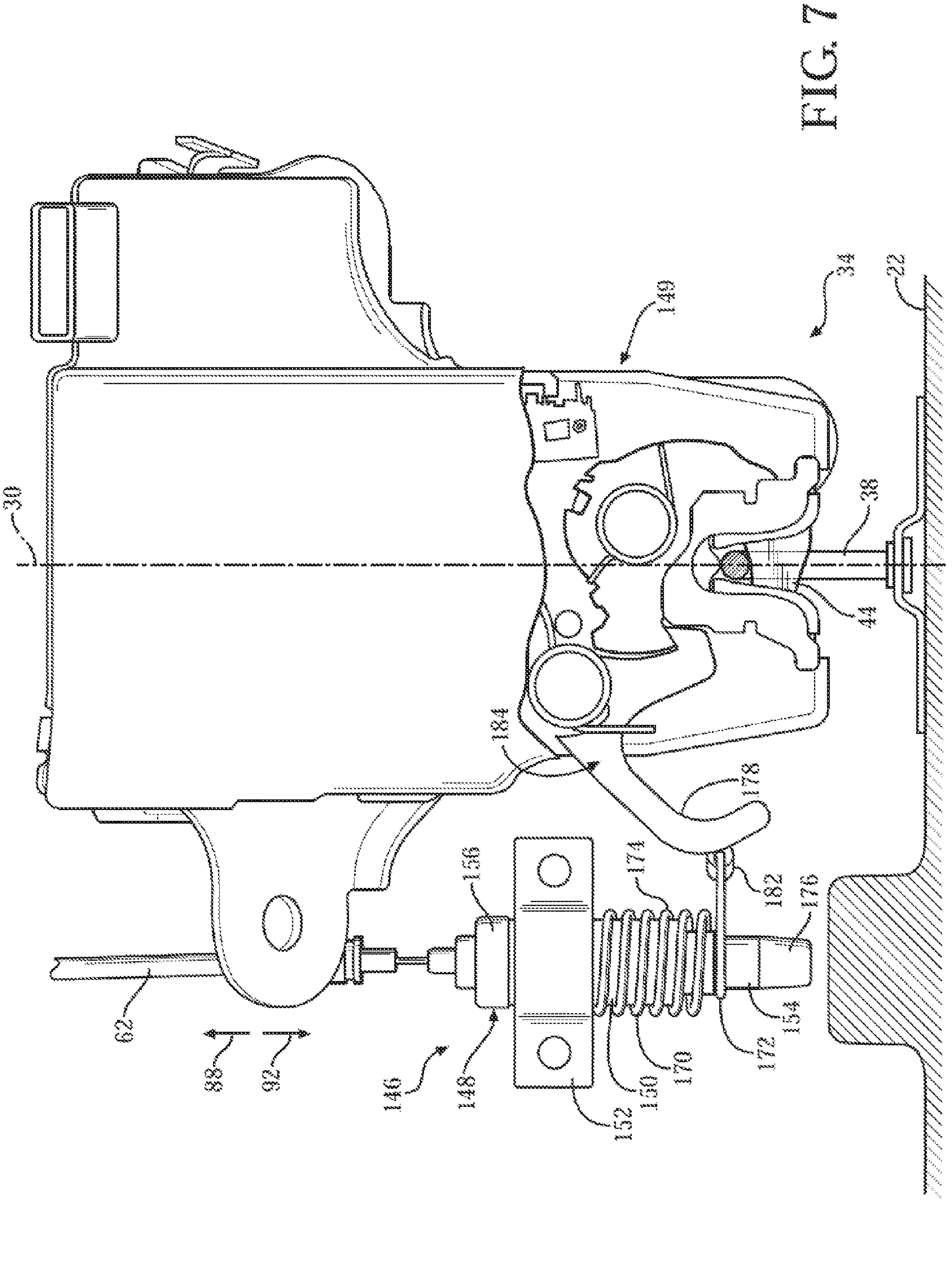
FIG. 7 is a schematic plan view of a latch system and a separate linearly actuated pop-up system showing the pop-up system in an un-sprung position.
Figure 8:
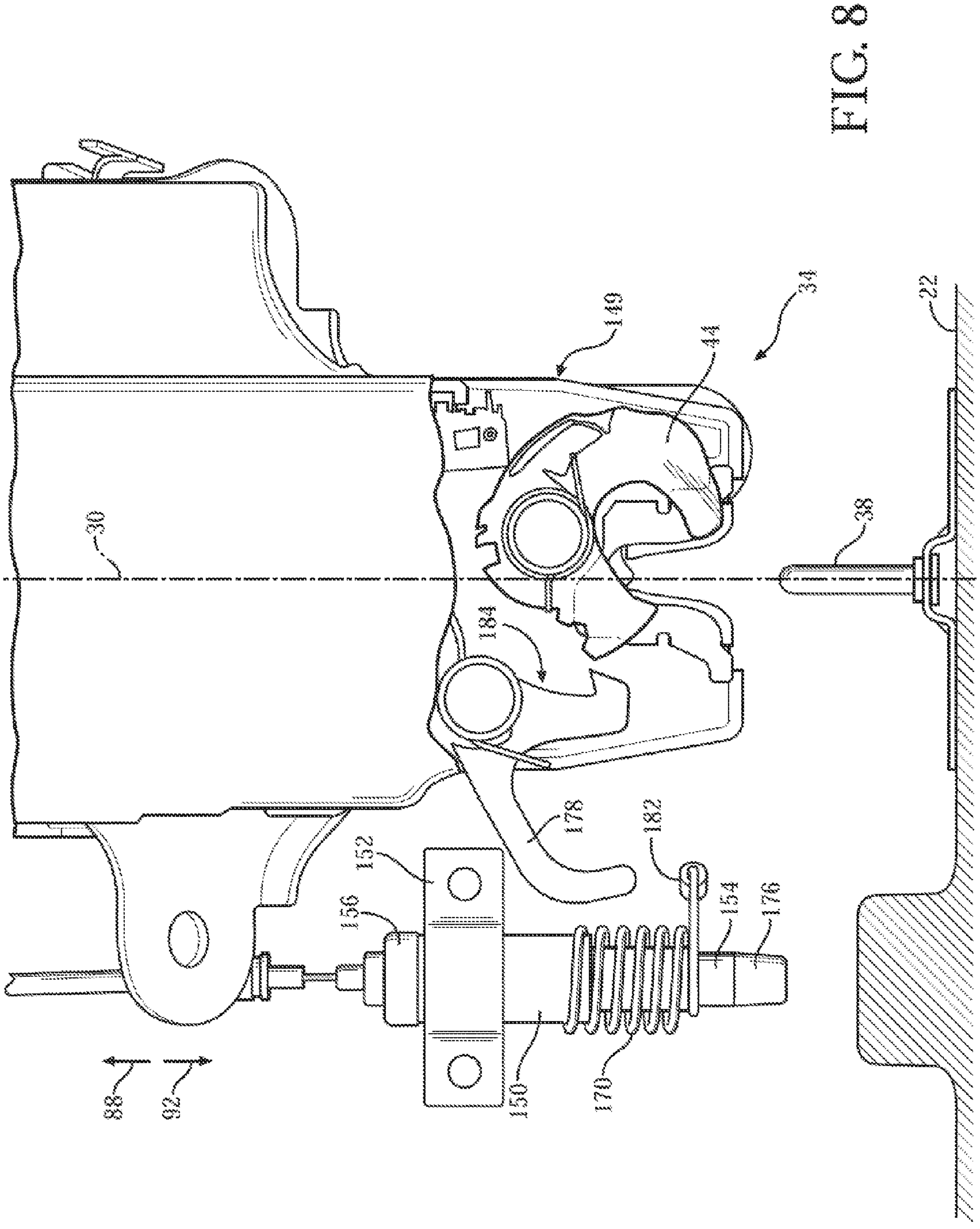
FIG. 8 is a schematic plan view of the latch system and the linearly actuate pop-up system showing the pop-up system in a sprung position.
Figure 9:
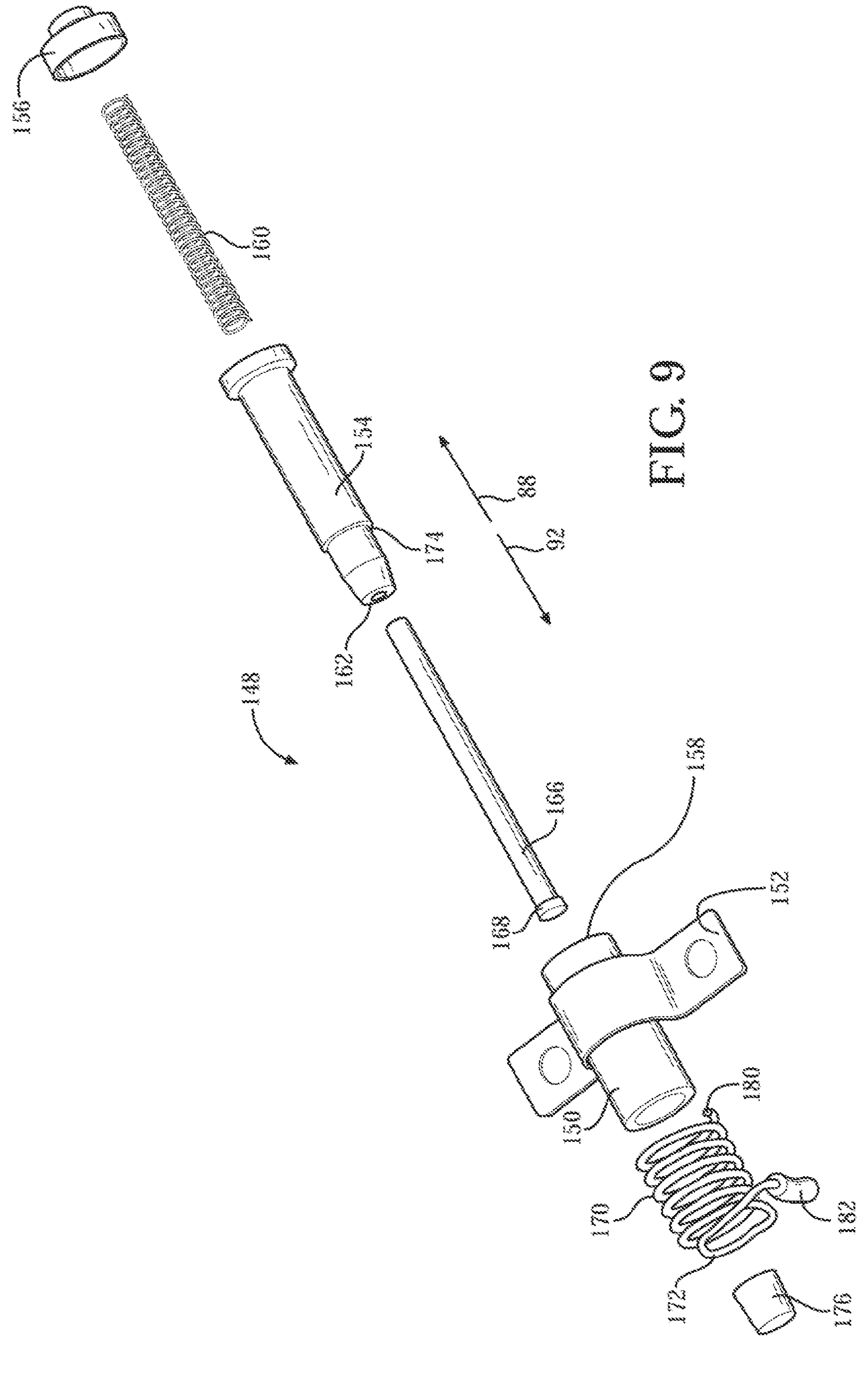
FIG. 9 is an exploded schematic perspective view of a plunger assembly of the linearly actuate pop-up system.

Referring to FIGS. 7 through 9, an alternative embodiment of the pop-up system is generally shown at 146. The pop-up system 146 includes a linear plunger assembly 148 that is disposed adjacent to and actuated by a latch mechanism 149. Accordingly, the pop-up system 146 is not integrated into the latch mechanism 149.

The linear plunger assembly 148 includes a housing 150 that is positioned against movement relative to the linear movement of the connecting cable 62. For example, a clamp 152 may be fastened to the closure panel 28 and secure the housing 150 in place relative to the closure panel 28. A plunger 154 is moveably disposed within an interior bore of the housing 150. The plunger 154 is linearly moveable relative to the housing 150 between an un-sprung position, and a sprung position.

A cap 156 is secured to a first axial end 158 of the housing 150, and prevents the plunger 154 from withdrawing from the interior of the housing 150 through the first axial end 158 of the housing 150. A pop-up spring 160 is disposed within the plunger 154. The pop-up spring 160 is biased between a first end 162 of the plunger 154 and the cap 156. The pop-up spring 160 is compressible between the first end 162 of the plunger 154 and the cap 156 between a compressed state and an uncompressed state. When the plunger 154 assembly is disposed in the un-sprung position, such as shown in FIG. 7, the pop-up spring 160 is disposed in the compressed state. When the plunger 154 assembly is disposed in the sprung position, such as shown in FIG. 8, the pop-up spring 160 is disposed in the uncompressed state.

A reset shaft 166 is coupled to an end of the connecting cable 62. The reset shaft 166 extends through the first end 162 of the plunger 154 and through an interior region of the pop-up spring 160. The reset shaft 166 is concentric with the plunger 154, the pop-up spring 160 and the housing 150. The reset shaft 166 includes a flanged end 168 that engages the first end 162 of the plunger 154 to prevent the plunger 154 from moving beyond the flanged end 168 as the reset shaft 166 moves with the connecting cable 62 in the first linear direction 88.

A retaining spring 170 includes a first axial end 180 that is coupled to the housing 150. An end coil 172 of the retaining spring 170 engages a retention lip 174 of the plunger 154 when the plunger 154 assembly is disposed in the un-sprung position to secure the plunger 154 in position relative to the housing 150. The retaining spring 170 releases the plunger 154 when actuated by the latch mechanism 149 to allow the pop-up spring 160 to decompress and the plunger 154 to move in the second linear direction 92 into contact with the closure panel 28 to apply the opening force. A rubber end 176 may be coupled to the first end 162 of the plunger 154 for contacting the closure panel 28.

The latch mechanism 149 includes a pawl assembly 184 having the first lever arm 42 for engaging the fork bolt 44. The pawl assembly 184 further includes a second lever arm 178 for engaging a second axial end 182 of the retaining spring 170. Rotation of the pawl assembly 184 rotates the second lever arm 178 into engagement with the second axial end 182 of the retaining spring 170 to move the retaining spring 170 laterally relative to the plunger 154, which disengages the end coil 172 of the retaining spring 170 from the retention lip 174 and releases the plunger 154, thereby allowing the plunger 154 to move into the sprung position, contacting the closure panel 28 to apply the opening force thereto.

Movement of the connecting cable 62 and the reset shaft 166 in the first linear direction 88, in response to the closure panel 28 moving from the closed position into the open position, moves the plunger 154 in the first linear direction 88, compresses the pop-up spring 160, and allows the retaining spring 170 to engage the retention lip 174 on the plunger 154 in interlocking engagement, thereby securing the plunger 154 in the un-spring position and the pop-up spring 160 in the compressed state until the next opening event triggers the release of the plunger 154.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:

a body including a closure panel and a counterbalanced hinge system rotatably attaching the closure panel to the body, wherein the counterbalanced hinge system includes a bias member arranged to apply an assist torque to the closure panel to bias the closure panel about a rotation axis from a closed position into an open position;

a latch system selectively interconnecting the closure panel and the body, wherein the latch system is operable to selectively couple the closure panel to the body when the closure panel is disposed in the closed position, and wherein the latch system is operable to selectively release the closure panel relative to the body to allow the closure panel to move from the closed position into the open position;

a pop-up system coupled to the closure panel and including a pop-up spring moveable from an un-sprung position into a sprung position to apply an opening force to the closure panel to move the closure panel out of the closed position simultaneously with the latch system selectively releasing the closure panel; and a reset system including a connecting cable interconnecting the counterbalanced hinge system and the pop-up system, wherein the reset system is operable to convert a portion of the assist torque applied by the counterbalanced hinge system into linear motion of the connecting cable to move the pop-up system from the sprung position into the un-sprung position automatically upon the closure panel moving into the open position.

2. A vehicle as set forth in claim 1 wherein the reset system converts rotational movement of the counterbalanced hinge system into linear movement of the connecting cable along a path.

3. A vehicle as set forth in claim 2 wherein the reset system includes a rack and pinion gear drive interconnecting the body and the counterbalanced hinge system.

4. A vehicle as set forth in claim 3 wherein the rack and pinion gear drive includes a rack base fixedly attached to the body and slideably supporting a rack gear thereon for back and forth movement.

5. A vehicle as set forth in claim 4 wherein the rack and pinion drive system includes a pinion gear attached to and rotatable with the counterbalanced hinge system about the rotational axis, wherein the rack gear and the pinion gear are disposed in meshing engagement with each other such that rotation of the pinion gear in a first rotational direction as the closure panel moves from the closed position into the open position moves the rack gear in a first linear direction, and rotation of the pinion gear in a second rotational direction as the closure panel moves from the open position into the closed position moves the rack gear in a second linear direction, opposite the first linear direction.

6. A vehicle as set forth in claim 5 wherein the connecting cable is coupled to the rack gear.

7. A vehicle as set forth in claim 6 wherein the connecting cable includes a stop for engaging the rack gear so that the connecting cable moves with the rack gear in the first linear direction.

8. A vehicle as set forth in claim 7 wherein the rack gear is freely moveable relative to the connecting cable in the second linear direction.

9. A vehicle as set forth in claim 2 wherein the pop-up spring is disposed in a compressed state to store energy when disposed in the un-sprung position, and wherein the pop-up spring is disposed in an un-compressed state when disposed in the sprung position.

10. A vehicle as set forth in claim 9 wherein the linear movement of the connecting cable along the path in a first linear direction moves the pop-up spring from the un-compressed state into the compressed state.

11. A vehicle as set forth in claim 10 wherein the latch system includes a latch mechanism attached to one of the body or the closure panel, and a striker attached to the other of the body and the closure panel.

12. A vehicle as set forth in claim 11 wherein the pop-up system is integrated into the latch mechanism.

13. A vehicle as set forth in claim 12 wherein the pop-up system includes a pop-up lever rotatably attached to a base plate of the latch mechanism, and a pop-up detent lever rotatably attached to the base plate of the latch mechanism, with the pop-up spring coupled to the base plate and interconnecting the pop-up lever and the pop-up detent lever to bias the pop-up lever and the pop-up detent lever relative to each other.

14. A vehicle as set forth in claim 13 wherein the pop-up lever includes a ledge and the pop-up detent lever includes a tooth, with the pop-up detent lever rotatable into a locking position so that the tooth engages the ledge in interlocking engagement to secure the pop-up lever in the un-sprung position and the pop-up spring in the compressed state.

15. A vehicle as set forth in claim 14 wherein the latch mechanism includes a pawl assembly having a first lever arm for engaging a fork bolt, and a second lever arm for engaging the pop-up detent lever, wherein rotation of the pawl assembly rotates the first lever arm out of engagement with the fork bolt to release the fork bolt from locking engagement with the striker, and rotates the second lever arm to move the pop-up detent lever into a release position to disengage the tooth from the ledge and allow the pop-up lever to move into the sprung position.

16. A vehicle as set forth in claim 15 wherein the connecting cable is attached to a distal end of the pop-up lever such that the linear movement of the connecting cable along the path in the first direction moves the pop-up lever into the un-sprung position, the pop-up detent lever into the locking position with the tooth engaging the ledge in interlocking engagement, and compresses the pop-up spring into the compressed state.

17. A vehicle as set forth in claim 11 wherein the pop-up system includes a linear plunger assembly disposed adjacent to and actuated by the latch mechanism.

18. A vehicle as set forth in claim 17 wherein the linear plunger assembly includes:

a housing positioned against movement relative to the linear movement of the connecting cable;

a plunger moveably disposed within an interior bore of the housing;

a cap secured to an axial end of the housing, with the pop-up spring disposed within the plunger and compressible between the plunger and the cap between the compressed state and the uncompressed state;

a reset shaft coupled to the connecting cable and extending through and concentric with the plunger, the pop-up spring and the housing, wherein the reset shaft includes a flanged end for engaging the plunger to prevent the plunger from moving beyond the flanged end as the reset shaft moves with the connecting cable in the first linear direction; and a retaining spring coupled to the housing and engaging the plunger, wherein the retaining spring secures the plunger in place relative to the housing when the pop-up system is disposed in the un-sprung position, and releases the plunger when actuated by the latch mechanism to allow the pop-up spring to uncompress and the plunger to move into contact with the closure panel to apply the opening force.

19. A vehicle as set forth in claim 18 wherein the latch mechanism includes a pawl assembly having a first lever arm for engaging a fork bolt, and a second lever arm for engaging the retaining spring, wherein rotation of the pawl assembly rotates the first lever arm out of engagement with the fork bolt to release the fork bolt from locking engagement with the striker, and rotates the second lever arm to move the retaining spring which releases the plunger and allows the plunger to move into the sprung position.

20. A counterbalanced hinge system for rotatably attaching a closure panel to a body for rotation about a rotation axis, the counterbalanced hinge system comprising:

a latch system selectively interconnecting the closure panel and the body, wherein the latch system is operable to selectively couple the closure panel to the body when the closure panel is disposed in a closed position, and wherein the latch system is operable to selectively release the closure panel relative to the body to allow the closure panel to move from the closed position into an open position;

a pop-up system coupled to the closure panel and including a pop-up spring moveable from an un-sprung position into a sprung position to apply an opening force to the closure panel to move the closure panel out of the closed position simultaneously with the latch system selectively releasing the closure panel; and a reset system including a rack and pinion gear drive operable to convert rotational movement of the closure panel into linear movement of the connecting cable along a path, and a connecting cable interconnecting the rack and pinion gear drive and the pop-up system, wherein the rack and pinion gear drive is operable to convert a portion of the assist torque applied by the counterbalanced hinge system into linear motion of the connecting cable to move the pop-up system from the sprung position into the un-sprung position automatically upon the closure panel moving into the open position;

wherein the pop-up spring is disposed in a compressed state to store energy when disposed in the un-sprung position, and wherein the pop-up spring is disposed in an un-compressed state when disposed in the sprung position; and wherein the linear movement of the connecting cable along the path in a first linear direction moves the pop-up spring from the un-compressed state into the compressed state.

* * * * *